UNITED STATES PATENT OFFICE.

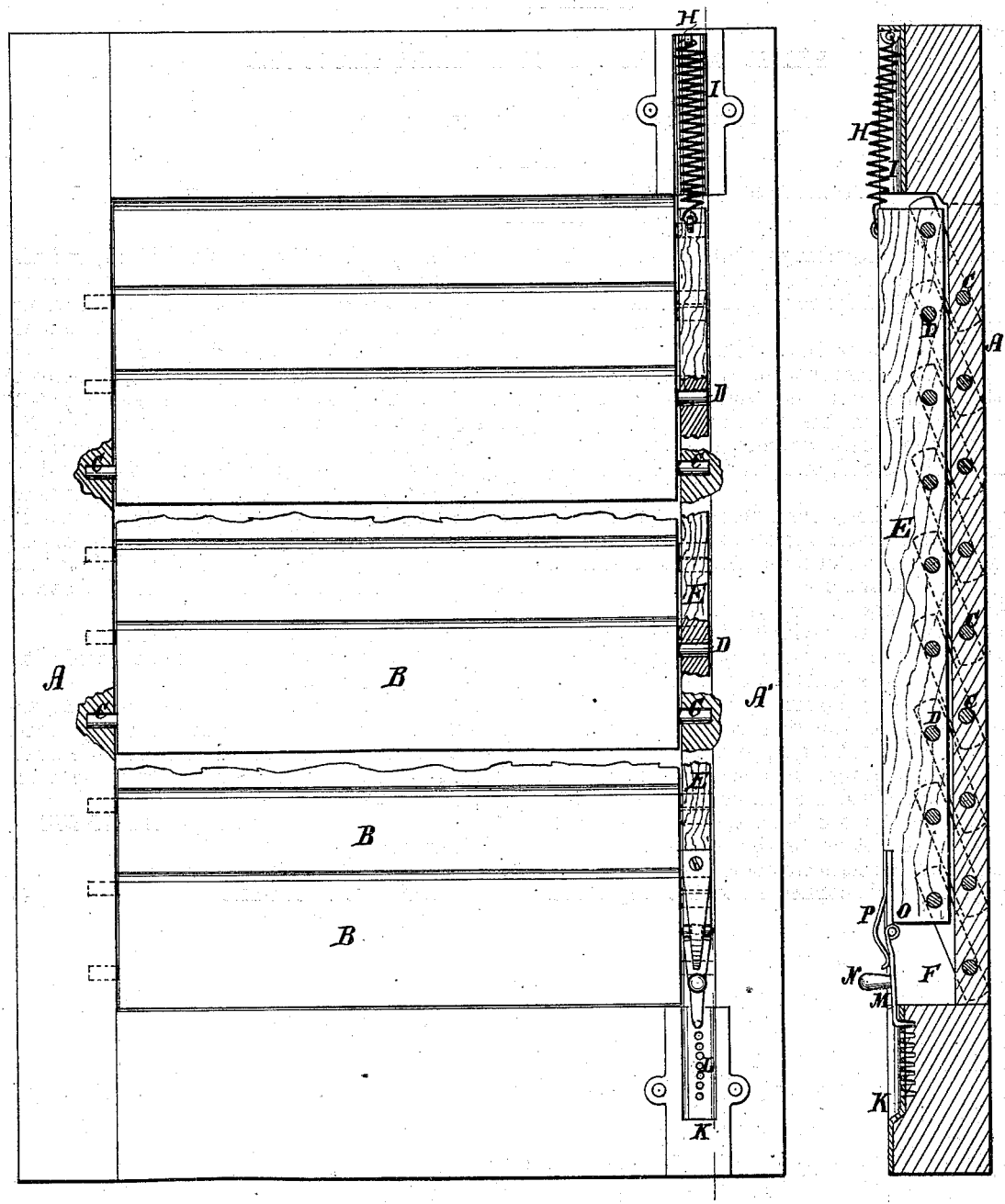

PERRY A. BURGESS, OF BUTLER, MISSOURI.

IMPROVEMENT IN BLIND-STOPS.

Specification forming part of Letters Patent No. 122,154, dated December 26, 1871.

Specification describing a new and Improved Blind-Slat Adjuster invented by PERRY A. BURGESS, of Butler, in the county of Bates and State of Missouri.

My invention is an improvement in the class of blind-slat adjusters in which a bar is connected with the slats at one end thereof; and the invention consists in the arrangement of parts hereinafter described, whereby the slats may be locked or held closed, or open to any desired extent.

Figure 1 is a front elevation of a blind with my improved adjuster applied, some parts being sectioned or broken out, and Fig. 2 is a section of Fig. 1 on the line $x\ x$.

A A' represents the stiles, and B the slats. The said slats are provided with a pivot, C, at each end near the rear edge, by which they are pivoted to the stiles, and they have another pivot, D, at one end near the inner edge by which they are pivoted to the adjusting bar E, which is fitted in a recess or rabbet, F, in the inner edge of the stile A' extending from one cross-piece to the other. The pivots D are placed as near to the outer edge of the bar E as they may be with safety, and the bottom of the recess is near the pins C so that the slats may close completely. A spiral spring, H, is connected to the upper end of the bar E and to the top of the blind, and adjusted to pull the bar up and close the slats when let free. A groove is formed in the blind frame for this spring, and a grooved plate, I, fastened therein for attaching the spring and preventing the latter from wearing the wood. It is grooved to let the spring and the bar E in flush with the surface of the blind. A grooved catch-plate, K, with a series of holes, L, is let into the frame at the lower end, and a catch, M, with a thumb-bit, N, is jointed to the lower end of the bar at O to engage with the said holes and hold the blinds more or less open, as required. P is a spring on the lower end of the catch-bar bearing on the catch to keep it in connection with the catch-plate L.

Having thus described my invention—

I do not claim an adjustable bar connected with the ends of the slats; but—

The bar E, spring H, and hinged catch M, arranged with the perforated plate K, and grooved plate I, and all set into the frame so as to be flush with the surface of the same, as shown and described.

PERRY A. BURGESS.

Witnesses:
    FLEMING V. HALLOWAY,
    FLAVIOUS J. SYGARD. (24)